Patented Feb. 2, 1954

2,668,121

UNITED STATES PATENT OFFICE 2,668,121

COATING FOR THE PRESERVATION OF FOODS

Marcello Rizzardi, Trieste, Italy

No Drawing. Application October 12, 1951, Serial No. 251,145

5 Claims. (Cl. 106—245)

This invention relates to a coating for the preservation of foods, and in particular, to foods having a shell or envelope, such as fruits, vegetables, eggs and the like, and further relates to a method for forming the coating.

It is an object of the invention to provide a coating for foods which once properly applied to the foods, as will be herein disclosed, prevents the escape of the chemical constituents of the foods, and prevents the entry of oxygen, bacteria and other chemicals to within the envelope, greatly reducing the cause of decomposition of the foods.

Eggs are known to lose their freshness after exposure to room temperature for an appreciable time, and it is current practice to store eggs under refrigeration to retain a semblance of freshness.

It is a further object of the invention to provide a coating, which upon proper application to the envelope or shell of the egg, will permit the egg to be stored without the need for refrigeration, and whereby the egg will retain its freshness.

The coating of the invention comprises the combination of pure virgin wax, vegetable oil, extract of chicory and extract of creosole. The combination is prepared in paste form and is applied to the article to be treated as a thin layer over the entire area of the outside surface.

The coating forming the invention is in general prepared by heating the wax to a temperature of approximately 100 degrees centigrade. The vegetable oil, which may advantageously be soya bean oil is then added to the heated wax, and the combination is stirred or otherwise agitated until the soya bean oil and the wax, or the vegetable oil and wax have combined. The combination of the wax and vegetable or soya bean oil is then permitted to cool to a temperature of approximately 32 degrees centigrade, at which time the creosole is added to the combination of the soya or vegetable oil and wax combination. The three ingredients thus far used are again stirred or otherwise agitated until all three have combined. This combination is permitted to reach room temperature at which time the extract of chicory is added.

In the preparation of the coating as herein disclosed, a ratio of ingredients comprising 14 ounces of pure virgin wax to 20 ounces of soya bean or vegetable oil, to 5 ounces of extract of chicory to 10 drops of creosole by volume was utilized.

Although I have herein disclosed my invention as comprising pure virgin wax, vegetable oil, creosole and oil of chicory of given proportions, mixed at certain temperatures, it is understood that the proportions and temperatures set forth may be varied within wide limits, and I therefore desire and intend that the claims herein be read within the spirit and scope of the invention.

What is claimed is:

1. A coating for the preservation of foods including pure virgin wax, vegetable oil, creosole and oil of chicory combined to form a paste.

2. A coating compound for the preservation of foods, consisting of a mixture of the proportion of 14 ounces of pure virgin wax to 20 ounces of soya bean oil, to 5 ounces of extract of chicory to 10 drops of creosole by volume.

3. The method of temporarily protecting foods from spoilage which consists of the coating of said foods with a fine film of a paste consisting of a mixture of the proportion of 14 ounces of pure virgin wax to 20 ounces of vegetable oil, to 5 ounces of extract of chicory to 10 drops of creosole by volume.

4. The method of temporarily protecting foods from spoilage which comprises coating of said foods with a fine film of a paste consisting of a mixture having the approximate proportions of 14 ounces of pure virgin wax to 20 ounces of soya vegetable oil, to 5 ounces of extract of chicory to 10 drops of creosole by volume.

5. A coating for the preservation of foods consisting of a mixture of the proportions of approximately 14 ounces of pure virgin wax to 20 ounces of vegetable oil, to 5 ounces of extract of chicory to 10 drops of creosole by volume.

MARCELLO RIZZARDI.

References Cited in the file of this patent

UNITED STATES PATENTS

| Number | Name | Date |
|---|---|---|
| 202,834 | Laflin | Apr. 23, 1878 |
| 295,525 | De Nise | Mar. 25, 1884 |
| 349,172 | Nichols | Sept. 14, 1886 |
| 1,450,408 | Brooks | Apr. 3, 1923 |
| 1,809,016 | Brogden et al. | June 9, 1931 |
| 2,021,137 | Stone | Nov. 19, 1935 |